Jan. 17, 1933.  P. S. MARTIN  1,894,278
ADJUSTABLE FEEDER
Filed May 4, 1929   2 Sheets-Sheet 2
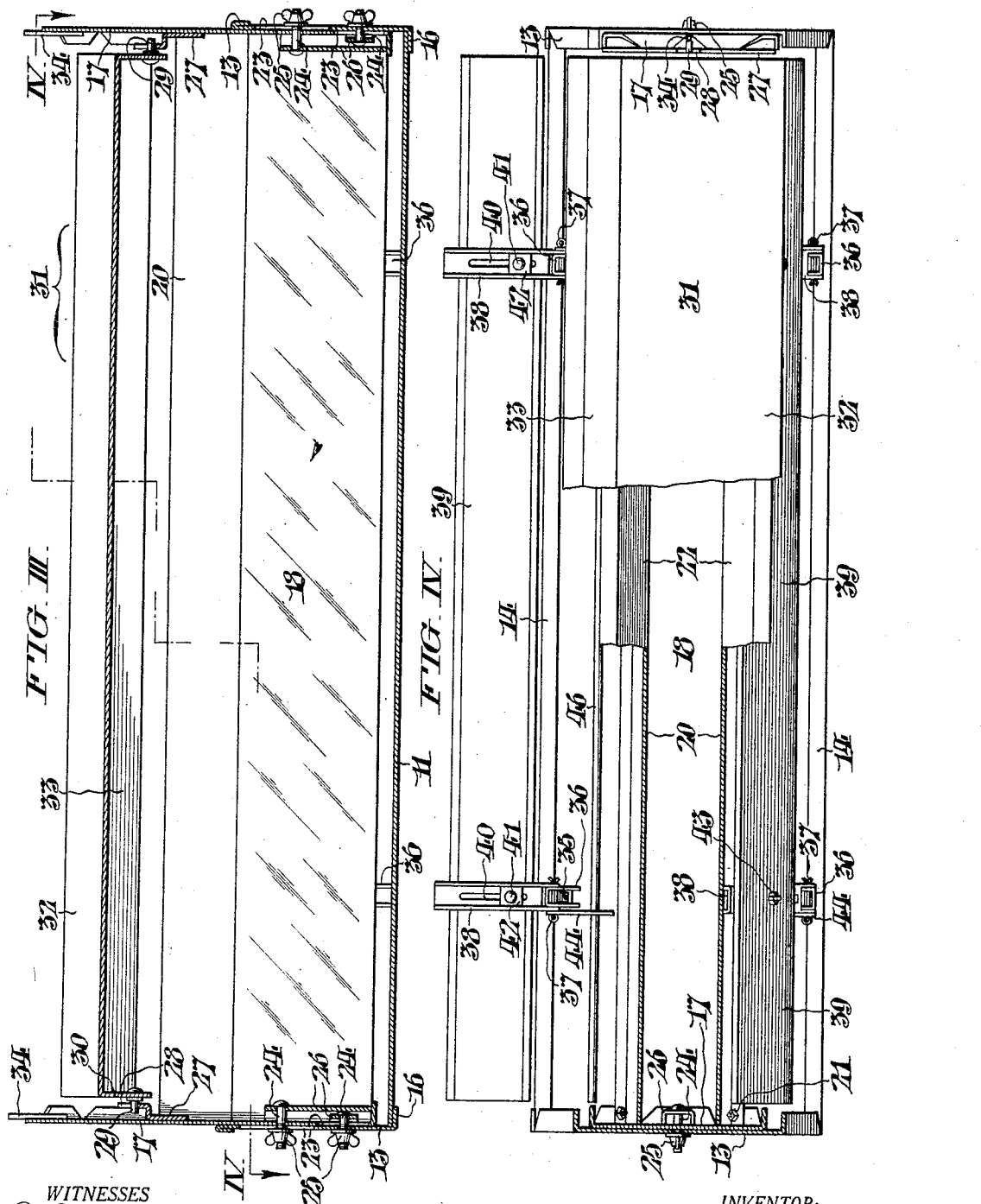

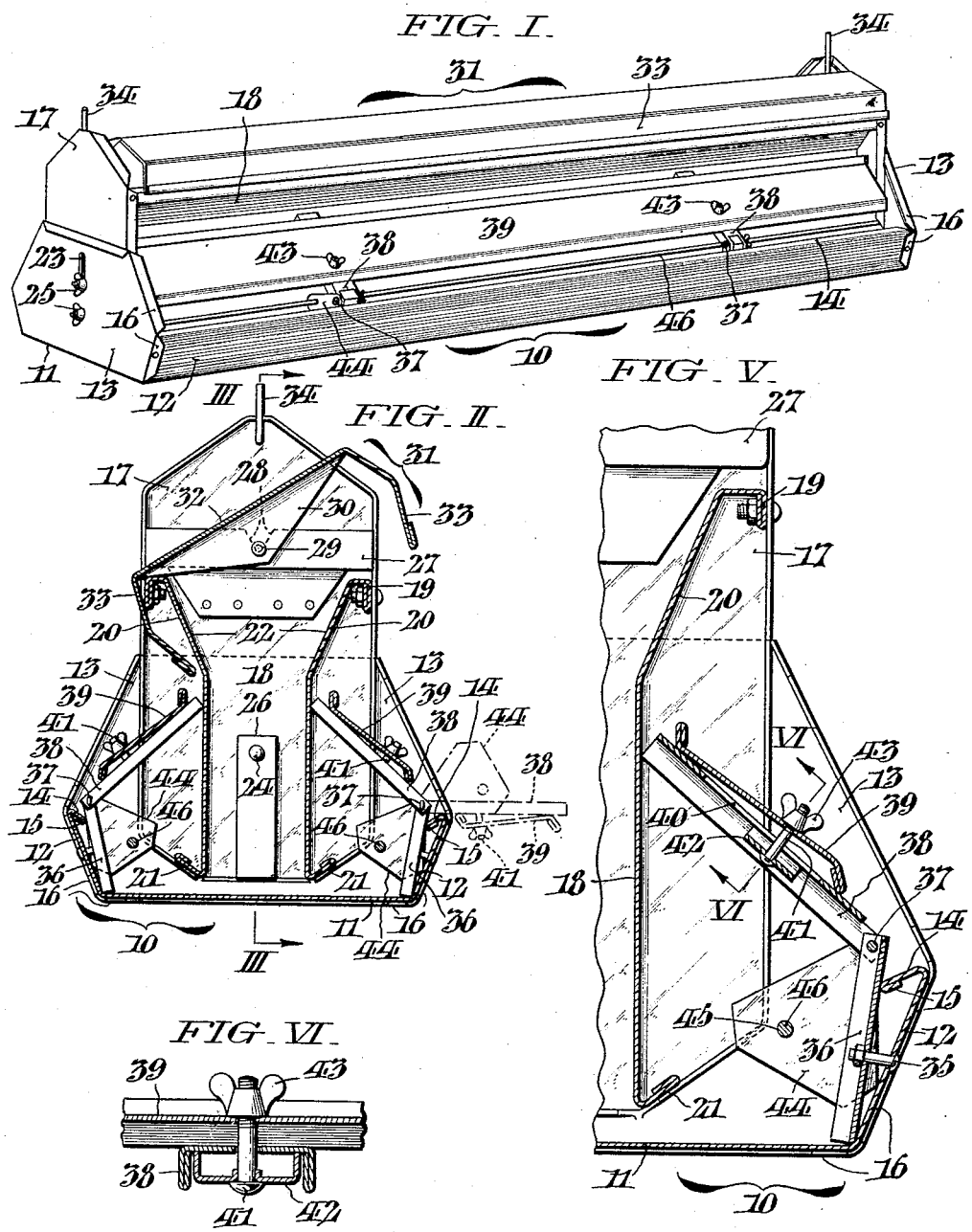
Jan. 17, 1933. P. S. MARTIN 1,894,278
ADJUSTABLE FEEDER
Filed May 4, 1929 2 Sheets-Sheet 1

Patented Jan. 17, 1933

1,894,278

UNITED STATES PATENT OFFICE

PERRY S. MARTIN, OF HARRISONBURG, VIRGINIA

ADJUSTABLE FEEDER

Application filed May 4, 1929. Serial No. 360,441.

This invention relates to feeders for fowl of differing species, and more particularly to a poultry feeder which can be conveniently and efficiently adjusted for chicks of various sizes, and I aim to provide a novel and improved device of the stated character having a large amount of feeding space, so protected that it is impossible for the birds to waste or soil the feed which is of vital importance in controlling disease in the raising of poultry.

Another object of the invention is the provision, in a device of the type referred to, of a trough having adjustably associated therewith a feed hopper, the position of which with respect to the trough controls the flow of fresh feed into said trough. This is necessary because some feeds are more fluent than others and also because the feed level should be varied for birds of different ages in order to assist in eliminating waste.

A further object of the invention is to provide a poultry feeder with adjustable hinged guard plates at the opposite open or accessible portions of the trough, for keeping the chicks out of said trough and thereby preventing waste and contamination of the feed. These guard plates are adjustable in a manner for increasing the size of the accessible portions to the feed trough as the chicks grow, while said plates may be swung entirely out of the way on their hinged connections when it is desired to feed scratch feed, a damp mash, or to permit easy cleaning of the trough.

A still further object of the invention is to provide the feeder with longitudinally extending rods normally arranged in the trough between the side walls and the hopper for forcing the chicks to pick into the feed and prevent them from raking it out of the trough, said rods being hingedly supported so that they may be swung entirely from the trough for the purposes previously set forth.

Still another object of the invention is to provide the feeder with a pivoted cover over the hopper of sufficient weight and so constructed as to swing to either side and cause considerable vibration of said hopper when birds attempt to perch on it. This vibration of the feed hopper eliminates clogging of the feed and insures a constant supply in the feed trough. Furthermore by having the cover pivoted so as to swing from side to side it serves, also, to prevent chicks from perching on the feeder.

A further object of the invention is to pivotally mount the hopper cover aforesaid in such a manner that it may also be bodily moved laterally of the device, thereby facilitating filling of the hopper from either side.

It is also an object of this invention to provide a poultry feeder of simple and substantial construction, which can be manufactured economically, and that will be found thoroughly efficient and practical in use.

With the foregoing and other objects in view, which will be apparent as the following detailed explanation proceeds, the present invention resides in the construction and arrangement of parts, as hereinafter set forth; it being understood that changes may be made without departing from the spirit of said invention.

In the drawings:

Fig. I is a perspective view of my improved feeder.

Fig. II is a vertical cross-section through the feeder, showing in dotted lines the position occupied by an adjustable plate and longitudinal rod when swung free from the trough.

Fig. III is a longitudinal vertical section, taken on the line III—III of Fig. II.

Fig. IV is a horizontal section, taken on the plane indicated by the line IV—IV of Fig. III.

Fig. V is an enlarged fragmentary section showing the structure for hingedly supporting an adjustable plate hereinafter fully explained; and, Fig. VI is a detail section, taken on the line VI—VI of Fig. V.

Like symbols of reference are applied to corresponding parts in all the views, while the subjoined claims serve to define the features of novelty over prior art.

Referring more particularly to the drawings, the numeral 10 designates a feed trough comprising a bottom 11, oppositely arranged side walls 12, and end walls 13. The side walls 12 diverge slightly from one another, as they extend upwardly, and have their upper portions turned inwardly, as at 14, towards one another, with the free edges thereof retroverted, as at 15. The end walls 13 have inwardly directed flanges 16 which engage beneath the bottom wall 11, as well as the outer faces of the side walls 12, and are secured thereto in any suitable manner to effectively attach said end walls 13 to the bottom and side walls 11 and 12, respectively.

The end walls 13 extend upwardly, a considerable distance beyond the side walls 12, and slidably support the end members 17 of a hopper 18. The end members 17 are provided at the various edges thereof with inturned flanges to permit convenient attachment of other walls of the hopper 18. As shown at 19, the upper portions of the side walls 20 of the hopper 18 are attached to the end members 17, while the lower ends of the side walls 20 are attached to the inturned flanges, as at 21.

By referring to Figure 2, it can be seen that the side walls 20 are spaced inwardly from the opposite side edges of the end members 17 and are arranged in spaced parallel relation to one another throughout the major portion thereof, and that the upper portions of said side walls 20 diverge from one another, as at 22, to facilitate convenient placing of mash feed in the hopper 18.

The lower ends of the material forming the side walls 20 are turned outwardly and upwardly at the points of connection with the inturned flanges of the end members 17, as also clearly shown at 21 in Fig. II.

The end walls 13 of the trough and the end members 17 of the hopper 18 lie adjacent one another and each is provided with a vertical slot 23 through which a bolt 24 carried by the opposite member extends. The outer ends of the bolts 24 have wing nuts 25 threaded thereon, which are adapted to be tightened for clamping action. The inner ends of each of the bolts 24 carry a bearing plate 26 which is substantially U-shaped in cross-section. By referring to Figs. III and IV, it can be seen that the bearing plate 26 carried by one bolt 24 is of small size and is received in the other bearing plate 26. Therefore, when it is desired to adjust the position of the hopper 18 with respect to the feed trough 10, the wing nuts 25 are loosened and said hopper moved vertically with respect to said trough until the desired position is had, whereupon the wing nuts 25 are tightened for holding the device at the requisite adjusted position.

Each of the end members 17 carries an offset or substantially Z-shaped plate 27 provided with a central notch 28 extending downwardly from the upper edge thereof. The notches 28 in the plates 27 receive stud bolts 29 carried by end plates 30 of a cover member 31. The cover member 31 also has a top wall 32 and oppositely arranged side walls 33. As the cover member 31 is pivotally supported to prevent fowls from perching thereon, the same may swing to either side and the lower edges of the end members 30 will engage the upper ends of the side walls 20 of the hopper 18 and thereby limit swinging movement of said cover member.

The upper edges of the end members 17 are arranged at angles so as to converge upwards, centrally thereof, and thereby, also serve to prevent fowls perching thereon. At the central points or apices of the end members 17 are arranged upstanding posts 34 which, likewise, prevent perching thereon.

Bolted, as at 35, to the side walls 12 of the trough 10 are channel members 36 which are spaced a considerable distance apart. The upper ends of the channel members 36 are hingedly connected by means of cotter pins or the like 37 to the lower ends of other channel members 38. The upper ends of the channel members 38 normally lie in the position, as indicated in Figs. II and V of the drawings. Supported by the channel members 38 are guard plates 39, which may be adjusted longitudinally of said channel members 38 for increasing or decreasing the accessible portions of the trough 10. Each of the channel members 38 is provided with a longitudinal slot 40 through which a bolt 41 extends, said bolt having on one end a bearing plate 42 substantially U-shaped in cross-section with a wing nut 43 on the opposite end for effecting binding action. The cotter pins 37, which hingedly connect the channel members 38 to the channel members 36, also hingedly support plates 44, which have openings 45 therein through which extend rods 46. It is to be noted that the rods 46 are arranged substantially in the center of the accessible portions to the trough 10.

In use, the cover member 31 is swung to either side of the hopper 18 to a position whereby the pivot studs 29 disengage from the notches 28 and slide along the upper edges of the offset plates 27 until in engagement with the inturned flanges of the hopper end members 17 in order that access may be gained to the upper portion of the hopper 18, for the purpose of filling the latter.

By then placing mash feed in the hopper 18 and adjusting the position of said hopper with relation to the trough 10, the feed will flow outwardly into said trough according to the space between the lower edge of the hopper 18 and the bottom 11 of the trough 10. If desired, the hopper 18 may be lowered so as to engage the bottom 11 of the trough 10 in order that feed may be placed in the opposite sides of said trough and thus used as feed pans.

When chicks are young, the guard plates 39 are adjusted downwardly on the channel members 38 so as to provide somewhat restricted openings to the feed and thus prevent chicks from getting into the feed with consequent waste; while the hopper 18 is adjusted with respect to the trough 10 for permitting a considerable flow of feed by elevating the level thereof relative to the trough 10 in order that the small chicks may reach same. As the chicks grow, the hopper 18 is adjusted downwardly with respect to the trough 10 so as to lower the level of feed into said trough, while the guard plates 39 are moved upwardly on the channel members 38 for increasing the size of the openings into the feed.

As shown in Figs. II and IV, the hingedly supported adjustable guard plates 39 may be swung entirely out of the trough 10 when feeding scratch feed or damp mash. At such times the rods 46 carried by the plates 44 are also swung from the trough 10. It can be seen that when the guard plates 39 and rods 46 are swung entirely from the trough 10, access may be had to said trough for cleaning or the like.

From the foregoing it will be clearly seen that my improved poultry feeder is constructed and arranged so that it is impossible for fowls to get into the feed and waste the same, or to soil said feed by contaminating the same with "droppings". The birds are prevented from perching on the inwardly-inclined tops 14 of the side walls 12, of the trough 10, due to the fact that the lower outer edges of the guard plates 39 are arranged adjacent thereto and would overbalance birds attempting to perch on the tops of said side walls. It is not possible for fowls to perch on the pivoted cover member 31, as the same will swing on its pivot studs 29 and pitch them therefrom. Also they cannot perch on the upper surfaces of the end members 17 due to the inclined converging upper edges thereof aided by the centrally arranged upstanding posts 34.

The cover member 31 is adapted to vibrate the device when swung to either side by impacting the hopper 18, and thus eliminate clogging of feed therein, as well as shaking feed down from the side walls 12 of the trough 10. As the cover member 31 is of considerable weight it will be seen that when a fowl attempts to perch on the high edge thereof, said fowl's weight will swing the cover member 31 on its pivots 29, thus causing the same to strike the upper edge of one side wall 20 of the hopper 18 and thus vibrate the device, thereby insuring a constant supply of feed to the trough 10.

Although I have somewhat minutely described a particular and preferred embodiment of my invention, it will be recognized that modifications may be readily effected, without departing from its scope; therefore it is to be distinctly understood the same is to be construed as broadly as just interpretation of the following claims, taken in conjunction with prior art, may reasonably allow.

Having thus described my invention, I claim:—

1. A feeder comprising a trough having side walls, end walls and a bottom wall, a hopper consisting of side walls and end walls, said hopper being adjustably carried by the trough, and a cover supported by pivot studs engaging notches, in offset members above and carried by the hopper end walls, for swinging movement.

2. A feeder comprising a trough having upstanding end walls, a hopper having the lower portion thereof arranged between the upstanding end walls of said trough, means fulcrumed between the trough end walls and coacting with the hopper to variably control feeding access into the trough, and means carried by the upstanding end walls of said trough for adjustably associating the position of the hopper with respect to the trough.

3. A feeder comprising a trough having side walls, end walls and a bottom, a hopper having side walls and end walls, the end walls of said hopper having the lower portions thereof arranged between the end walls of the trough, means pivoted between the trough end walls and coacting with the hopper to variably control feeding access into the trough, and means carried jointly by the end walls of the trough and the end walls of the hopper for adjusting vertically the position of the hopper with respect to the trough.

4. A feeder comprising a trough, a hopper adjustably carried by the trough for regulating the flow of feed from the hopper to the trough, said hopper having upstanding end walls, and a cover having pivot studs engaging central notches in Z-section members supported between said upstanding end walls and adapted to swing to either side of the device.

5. A feeder comprising a trough, a hopper adjustably carried by the trough for regulating the flow of feed from said hopper into the trough, said hopper having upstanding end walls, offset Z-section brackets carried by the upstanding end walls of the hopper, said offset brackets having notches formed therein from the upper edge downwardly thereof and arranged centrally of the hopper, a cover embodying oppositely arranged side walls serviceable as movement limiting members, and studs carried by said cover adapted to be received in the notches of the offset brackets for pivotally supporting the cover between the upstanding ends of the hopper.

6. A feeder comprising a trough having an open upper portion, a hopper carried by the trough in the upper open portion and spaced from the opposite side walls of the trough to form opposite accessible portions in the trough, adjustable guard plates fulcrumed in the end walls of the trough and coacting with the hopper side walls to variably control access to the trough, and means for adjusting the positions of said guard plates for varying the entrance to the accessible portions of said trough.

7. A feeder comprising a trough, a hopper arranged in the trough and providing accessible portions to the trough to both sides thereof, bars hingedly connected at the sides of the trough, and guard plates adjustably supported by the bars for varying entrance to the accessible portions of the trough.

8. A feeder comprising a trough having oppositely arranged side walls, a hopper carried by the trough and spaced from the oppositely arranged side walls for providing accessible portions into the trough, members hingedly carried adjacent the upper edges of the side wall of the trough, and longitudinally extending rods carried by said members and arranged in the trough longitudinally of the accessible portions aforesaid.

9. A feeder comprising a trough having oppositely arranged side walls, a hopper carried by the trough and spaced from the oppositely arranged side walls for providing accessible portions into the trough, members hingedly carried adjacent the upper edges of the side wall of the trough, longitudinally extending rods carried by said members and arranged in the trough longitudinally of the accessible portions aforesaid, bars hinged to the trough adjacent the point of hinged connection of said members, and plates adjustably carried by said bars for varying entrance into the accessible portions of the trough.

10. A feeder comprising a trough having oppositely arranged side walls, a hopper arranged in the trough and spaced from the side walls of the same for providing oppositely arranged accessible portions, brackets carried by the side walls of the trough, bars hingedly connected to the upper ends of the brackets, and guard plates adjustably carried longitudinally of said bars for varying entrance to the accessible portions of the trough.

11. A feeder comprising a trough having oppositely arranged side walls, a hopper arranged in the trough and spaced from the side walls of the same for providing oppositely arranged accessible portions, brackets carried by the side walls of the trough, bars hingedly connected to the upper ends of the brackets, guard plates adjustably carried longitudinally of said bars for varying entrance to the accessible portions of the trough, members also hingedly connected to the upper ends of the brackets, and longitudinally extending rods carried by said members and arranged in the accessible portions of the trough.

12. A feeder comprising a trough having side walls, upstanding end walls and a bottom wall, a hopper having end walls and side walls, the lower major portions of said side walls being spaced inwardly from the edges of the end walls, while the upper portions of said side walls diverge from each other as they extend upwardly to the opposite edges of the end walls, said hopper being adjustable vertically in the trough for varying the flow of feed from the hopper into the trough and the end walls of the hopper extending upwardly beyond the side walls thereof, and a cover having pivot studs engaging central notches of Z-section members supported between the end walls of the hopper, the upper edges of the side walls of the hopper affording means for limiting swinging movement of said cover.

13. A feeder comprising a trough, a hopper having upwardly extended end walls, upstanding offset plates carried by the end walls of said hopper with the upper portions thereof spaced therefrom, said offset plates having downwardly extending notches located centrally of the hopper, a cover member, oppositely extending studs carried by the ends of the cover member and adapted to normally seat in the notches for pivotally supporting the cover member, and inwardly directed flanges on the upstanding end walls of the hopper engageable by the studs on the cover member when said cover member is disengaged from the offset plate notches and is moved bodily to either side of the feeder to accommodate filling of the hopper.

14. A feeder comprsing a trough, a hopper arranged for supplying feed to the trough, a pair of Z-section plates secured one at each end of the hopper and individually provided with a central notch therein, a cover member, oppositely extending studs carried by the ends of the cover member and adapted to normally rest in the notches for pivotally mounting the cover, and means integral with the hopper end walls for limitng movement of the studs in either direction when disengaged from the notches upon movement of the cover member bodily in either direction.

15. A feeder comprising a trough, a hopper for supplying feed to the trough, a cover member rockably supported by end projections engaging central notches of bearers in the hopper, the rocking connection of the cover member being such that said cover member may also be bodily moved laterally along the bearers in either direction.

16. A feeder comprising a trough, a hopper for supplying feed to the trough, a cover member rockably supported by end projections engaging central notches of bearers in the hopper, the rocking connection of the cover member being such that said cover member may also be bodily moved laterally along the bearers to either side within the confines of the hopper end walls.

17. A feeder comprising a trough, a hopper for supplying feed to the trough having upstanding end walls having transverse Z-section bearers mounted thereon, a cover rockably mounted by end projections engaging central notches in the Z-section bearers on the hopper upstanding end walls, said hopper end walls having their upper portions convergently angled to points centrally of the feeder, and upstanding posts at the apices of said convergently angled portions.

18. A feeder comprising a trough having an open upper portion bounded by integral side and end walls, a hopper adjustably supported by the end walls of the trough in the upper open portion and spaced from the opposite side walls of said trough to form oppositely arranged accessible portions to the trough, and spaced channel members with an adjustable guard plate fulcrumed between the trough end walls for variably controlling entrance to the accessible portions aforesaid.

19. A feeder comprising a trough, a hopper carried by the trough and providing an accessible portion to the trough, an adjustable guard plate arranged over the accessible portion between the trough end walls and coacting with the hopper side walls to variably control the entrance thereinto, and a rod disposed longitudinally in the center of the accessible portion.

20. A feeder comprising a trough having side walls, end walls and a bottom, said side walls diverging as they extend upwardly, flanges arranged upon the upper portions of the side walls and extending inwardly and downwardly therefrom, a hopper adjustably carried by the end walls of the trough, Z-section members transversely of the hopper end walls, a cover having pivot projections engaging central notches in the Z-section members of the hopper ends and adapted to swing to either side, and means for limiting swinging movement of the cover to either side.

21. A feeder comprising a trough with Z-section bearers across its end walls carried by the trough, and a cover member rockably supported by pivot projections at its ends engaging the Z-section bearers of the hopper, and being limited in its movement in either direction, said cover member side walls serviceable as weights to vibrate the hopper when rocked to its limit in either direction.

In testimony whereof, I have hereunto signed my name at Philadelphia, Pennsylvania, this 25th day of April, 1929.

PERRY S. MARTIN.